(12) United States Patent
Kuroishi

(10) Patent No.: US 10,081,145 B2
(45) Date of Patent: Sep. 25, 2018

(54) TIRE FORMING-MOLD AND TIRE MANUFACTURING METHOD

(71) Applicant: BRIDGESTONE CORPORATION, Tokyo (JP)

(72) Inventor: Kazuya Kuroishi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 242 days.

(21) Appl. No.: 15/123,344

(22) PCT Filed: Mar. 5, 2015

(86) PCT No.: PCT/JP2015/056567
§ 371 (c)(1),
(2) Date: Sep. 2, 2016

(87) PCT Pub. No.: WO2015/133589
PCT Pub. Date: Sep. 11, 2015

(65) Prior Publication Data
US 2017/0057186 A1    Mar. 2, 2017

(30) Foreign Application Priority Data
Mar. 7, 2014    (JP) .................................. 2014-045638

(51) Int. Cl.
*B29D 30/06*    (2006.01)
*B29C 33/10*    (2006.01)
*B29D 30/72*    (2006.01)

(52) U.S. Cl.
CPC .......... *B29D 30/0606* (2013.01); *B29C 33/10* (2013.01); *B29D 2030/0612* (2013.01); *B29D 2030/726* (2013.01)

(58) Field of Classification Search
CPC ............................ B29D 30/0606; B29C 33/10
See application file for complete search history.

(56) References Cited

U.S. PATENT DOCUMENTS 3,399,257 A * 8/1968 Ueno ..................... B29D 30/72
                                                                152/523
4,812,281 A * 3/1989 Beard ..................... B29C 33/10
                                                                264/315

FOREIGN PATENT DOCUMENTS

CN          1088509 A      6/1994
JP       07-024835 A       1/1995
(Continued)

OTHER PUBLICATIONS

Communication dated May 3, 2017, from the State Intellectual Property Office of People's Republic of China in counterpart Application No. 2015800126055.
(Continued)

*Primary Examiner* — Robert A Vetere
(74) *Attorney, Agent, or Firm* — Sughrue Mion, PLLC

(57) ABSTRACT

In each protrusion-forming recess of a mold, a non-through-hole vent is provided at one end side, and a through-hole vent that is longer than the non-through-hole vent is provided at another end side. When there is an ingress of rubber of a green tire into each protrusion-forming recess, air inside the protrusion-forming recess is discharged through the through-hole vent and the minute amount of air remaining inside escapes to the non-through-hole vent. Each through-hole vent is set with a large capacity, enabling an ingress of rubber into the vent hole that will later become spew to be stopped inside the through-hole vent. Since the volume of air that is trapped inside the protrusion-forming recess is a minute amount, and so the volume of air that escapes into the non-through-hole vent is also a minute amount.

5 Claims, 9 Drawing Sheets

(56) References Cited

FOREIGN PATENT DOCUMENTS

| | | |
|---|---|---|
| JP | 2010-012666 A | 1/2010 |
| JP | 2012-029377 A | 2/2012 |
| JP | 2012-040769 A | 3/2012 |
| JP | 2013-060181 A | 4/2013 |
| WO | 2011142342 A1 | 11/2011 |

OTHER PUBLICATIONS

International Search Report for PCT/JP2015/056567 dated May 26, 2015.

* cited by examiner

TIRE FORMING-MOLD AND TIRE MANUFACTURING METHOD

CROSS REFERENCE TO RELATED APPLICATIONS

This application is a National Stage of International Application No. PCT/JP2015/056567 filed Mar. 5, 2015, claiming priority based on Japanese Patent Application No. 2014-045638 filed Mar. 7, 2014, the contents of all of which are incorporated herein by reference in their entirety.

TECHNICAL FIELD

The present invention relates to a tire forming-mold and a tire manufacturing method for molding a pneumatic tire formed with a protrusion on the surface thereof.

BACKGROUND ART

Tire forming-molds have been proposed for manufacturing pneumatic tires that include protrusions or the like for generating a turbulent flow on the surface of the tire, for example (see, for example, Japanese Patent Application Laid-Open (JP-A) No. 2012-029377).

If the shape (height and edges) of the turbulent flow generating protrusions is not manufactured as intended, the expected performance cannot be exhibited. When molding the protrusions, the protrusions cannot be formed in the intended shape if air collects in corners of protrusion-forming recesses for forming the protrusions. Thus, vent holes are provided in the mold, air is discharged, and the protrusions are formed.

In the tire forming-mold of JP-A No. 2012-029377, a recess shaped non-through-hole vent, that permits entry of air from the protrusion-forming recesses, is provided at the protrusion-forming recesses in order to suppress air, which is present in the indented shaped protrusion-forming recesses of the mold for molding the protrusions, from collecting during vulcanization.

In tire forming-molds generally employed hitherto, plural through-hole vents for discharging air from inside the mold are provided penetrating to the mold exterior in order to suppress the occurrence of air collecting inside the mold.

SUMMARY OF INVENTION

Technical Problem

However, in tire forming-molds that are only provided with the through-hole vents, rubber sometimes flows to the outside of the mold through the short through-hole vents, and the rubber outside the mold that has exited through the through-hole vents forms lumps and hardens. When the rubber outside the mold that has exited through the through-hole vents forms lumps and hardens, spews (rubber that has hardened inside the vent holes) break off at unintended locations when extracting the tire from the mold and the broken-off spews remain inside the through-hole vents, such that effort is required to clean the mold and productivity is impaired.

However, in tire forming-molds only provided with non-through hole vents, a phenomenon sometimes occurs in which a leading end of the spew becomes sticky after tire vulcanization, the surface of the vulcanized tire becomes sticky, and the sticky rubber remains on the mold surface, such that there is room for improvement.

As a result of various investigations into the reason why the leading end of the spews formed to the protrusions becomes sticky when a tire is vulcanization molded in a tire forming-mold only provided with non-through-hole vents, the inventors have found that portions in contact with air are also sticky after vulcanization in cases in which a large amount of air remains inside the non-through-hole vents.

In consideration of the above circumstances, an object of an exemplary embodiment of the present invention is to provide a tire forming-mold and a tire manufacturing method capable of reducing the effort required to clean the mold and of improving tire productivity.

Solution to Problem

A tire forming-mold according to a first aspect includes: a mold including a surface-forming section that contacts a surface of a green tire and embosses a tire outer face; a recess shaped protrusion-forming recess for forming a protrusion on the tire outer face, the protrusion-forming recess being provided at the mold; a non-through-hole vent that has one end portion in communication with the protrusion-forming recess and another end portion terminating inside the mold; and a through-hole vent that is provided at the mold, that is set with a larger capacity than the non-through-hole vent, that is formed in a different position in the protrusion-forming recess than that of the non-through-hole vent, and has one end in communication with the protrusion-forming recess and another end in communication with a mold outer portion.

In the tire forming-mold according to the first aspect, the recess shaped protrusion-forming recess is provided at the mold in order to form the protrusion on the tire outer face, such that there is an ingress of the rubber of the green tire into the protrusion-forming recess when the surface of the green tire is pressed against the surface-forming section. When there is an ingress of the rubber of the green tire into the protrusion-forming recess, first, a large portion of the air inside the protrusion-forming recess is discharged to the mid exterior through the through-hole vent. Part of the ingress of the rubber of the green tire into the protrusion-forming recess then intrudes into the through-hole vent. In a state in which the rubber has entered a large part of the protrusion-forming recess, air in the vicinity of the through-hole vent is discharged through the through-hole vent; however, a minute amount of air that is trapped at locations separated from the through-hole vent, due to the ingress of the rubber of the green tire into the protrusion-forming recess, sometimes remains inside the protrusion-forming recess. However, the minute amount of air inside the protrusion-forming recess is further pressed by further ingress of the rubber of the green tire, and escapes to the non-through-hole vent, thereby ultimately enabling the rubber of the green tire to fill the protrusion-forming recess without any gaps.

The through-hole vent is set with a larger capacity than the non-through-hole vent, thereby enabling the ingress of rubber to be stopped inside the through-hole vent, and enabling the ingress of rubber into the through-hole vent to be suppressed from being pushed out from the mold. Any ingress of rubber into the through-hole vent becomes spew after vulcanization; however, the spew stops inside the through-hole vent, thereby enabling the spew to be removed from the through-hole vent without breaking off.

Since the volume of air that is trapped inside the protrusion-forming recess is a minute amount, the volume of air that escapes to inside the non-through-hole vent is also a minute amount. This enables a phenomenon, in which the portion of rubber in contact with air inside the non-through-hole vent becomes sticky after vulcanization, to be suppressed.

As second aspect is the tire forming-mold according to the first aspect, wherein the through-hole vent is formed at a portion at which a mold thickness from the protrusion-forming recess to the mold outer face is thicker than the non-through-hole vent.

In the tire forming-mold according to the second aspect, the through-hole vent is formed at a portion at which the mold thickness from the protrusion-forming recess to the mold outer face is thicker than the non-through-hole vent. This enables the length of the through-hole vent to be easily made longer than the length of the non-through-hole vent, thereby enabling the capacity of the through-hole vent to be increased.

A third aspect is the tire forming-mold according to the first aspect or the second aspect, wherein the protrusion-forming recess is provided at a portion of the surface-forming section that forms a tire side portion, the protrusion-forming recess forming a turbulent flow generating protrusion that generates a turbulent flow during tire rotation.

In the tire forming-mold according to the third aspect, the protrusion-forming recess is provided at a portion of the surface-forming section that forms the tire side portion. This enables the turbulent flow generating protrusion, which can generate a turbulent flow during tire rotation and cool the tire, to be formed at the side portion of the tire.

A tire forming-mold according to a fourth aspect is the tire forming-mold according to any one of the first aspect to the third aspect, wherein depth directions of the non-through-hole vent and the through-hole vent are aligned with a movement direction of the mold.

In the tire forming-mold according to the fourth aspect, spews formed in the non-through-hole vent and the through-hole vent move in the depth directions of the non-through-hole vent and the through-hole vent when the mold is moved. This enables the spews to be smoothly extracted from the non-through-hole vent and the through-hole vent.

A tire manufacturing method according to a fifth aspect includes loading a green tire into an interior of the tire forming-mold of any one of the first aspect to the fourth aspect, expanding the green tire loaded into the tire forming-mold using a bladder, pressing a surface of the green tire against the surface-forming section, and causing an ingress of unvulcanized rubber configuring the green tire into the protrusion-forming recess, and heating and vulcanizing the green tire.

In the tire manufacturing method according to the fifth aspect, the operation described in the first aspect can be obtained by performing the process of loading a green tire into the interior of the tire forming-mold of any one of the first aspect to the fourth aspect, the process of expanding the green tire loaded into the tire forming-mold using the bladder, pressing the surface of the green tire against the surface-forming section, and causing the ingress of unvulcanized rubber configuring the green tire into the protrusion-forming recess.

Effects of Invention

As explained above, the tire forming-mold according to the first aspect has excellent effects of enabling spew to be easily removed without breaking off when extracting the vulcanized tire, and of suppressing stickiness on the surface-forming section by suppressing the occurrence of stickiness on the tire outer face, thereby enabling the effort required to clean the mold to be reduced.

In the tire forming-mold according to the second aspect, the through-hole vent is formed at a portion at which the mold thickness from the protrusion-forming recess to the mold outer face is thicker than that of the non-through-hole vent. This enables the length of the through-hole vent to be easily made longer than the length of the non-through-hole vent by simple machining in a straight line using a drill or the like, thereby facilitating the machining of the mold.

The tire forming-mold according to the third aspect enables the turbulent now generating protrusion to be simply formed at the side portion of the tire.

The tire forming-mold according to the fourth aspect enables spews to be smoothly extracted from the through-hole vent and the non-through-hole vent.

The tire manufacturing method according to the fifth aspect has excellent effects of enabling spew to be easily removed without breaking off when extracting the vulcanized tire, and of suppressing stickiness on the surface-forming section by suppressing the occurrence of stickiness on the tire outer face, thereby enabling the effort required to clean the mold to be reduced.

DESCRIPTION OF EMBODIMENTS

Explanation follows regarding a tire forming-mold IC) according to an exemplary embodiment of the present disclosure, with reference to FIG. 1 to FIG. 5.

Configuration of Pneumatic Tire

Figure 1:
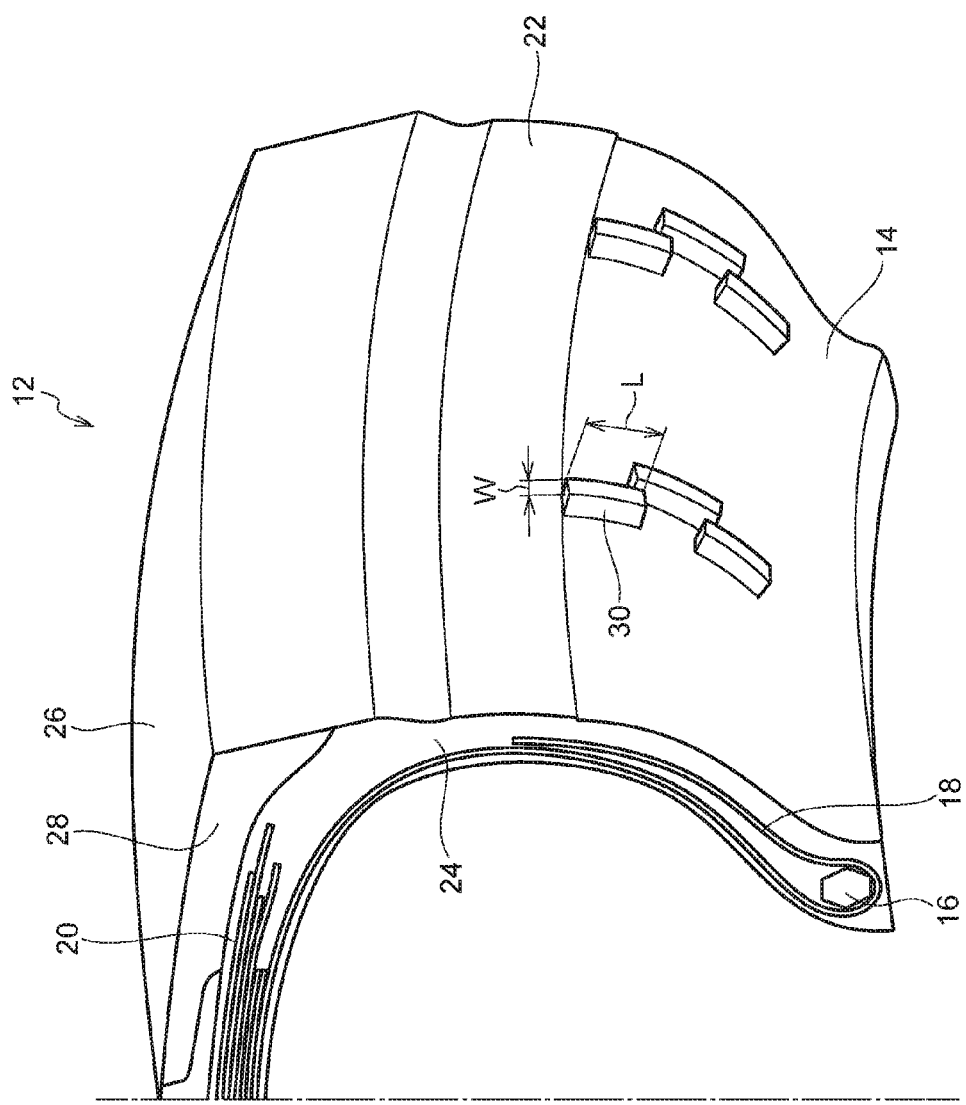
FIG. 1 is a perspective view illustrating a partially sectioned pneumatic tire molded using a tire forming-mold according to an exemplary embodiment of the present invention.

First, explanation follows regarding configuration of a pneumatic tire 12 manufactured by the tire forming-mold 10 according to the present exemplary embodiment, with reference to FIG. 1.

The pneumatic tire 12 that is the vulcanization bonded end product illustrated in FIG. 1 has a common structure including bead cores 16 embedded in respective bead portions 14, a carcass 18 formed of at least one carcass ply with end portions wound from the tire inside toward the outside of the respective bead cores 16, a belt 20 formed of at least one belt ply disposed at a tire radial direction outside of the carcass 18, side rubber layers 24 that are disposed at tire width direction outsides of the carcass 18 and form the respective bead portions 14 and sidewall portions 22, and a tread rubber layer 28 that is disposed at the tire radial direction outside of the belt 20 and forms a tread portion 26.

Turbulent flow generating protrusions 30, which generate a turbulent flow while running so as to cool the bead portions 14, are provided on the surface of each bead portion 14. The turbulent flow generating protrusions 30 of the present exemplary embodiment each have a substantially rectangular bodied shape and are formed elongated along the tire radial direction in a tire side-on view.

As an example, a width dimension W of each turbulent flow generating protrusion 30 is 5 mm, and a length (tire radial direction dimension) of each turbulent flow generating protrusion 30 is 20 mm. Note that the dimension, spacing, and number of the turbulent flow generating protrusions 30 may be set as appropriate according to the type and use of the tire.

In the present exemplary embodiment, three turbulent flow generating protrusions 30 disposed alternately to each other in the tire radial direction configure a set, and the sets of turbulent flow generating protrusions 30 are disposed on the surface of each bead portion 14 at spacings around the tire circumferential direction.

Configuration of Tire Forming-Mold

Figure 2:
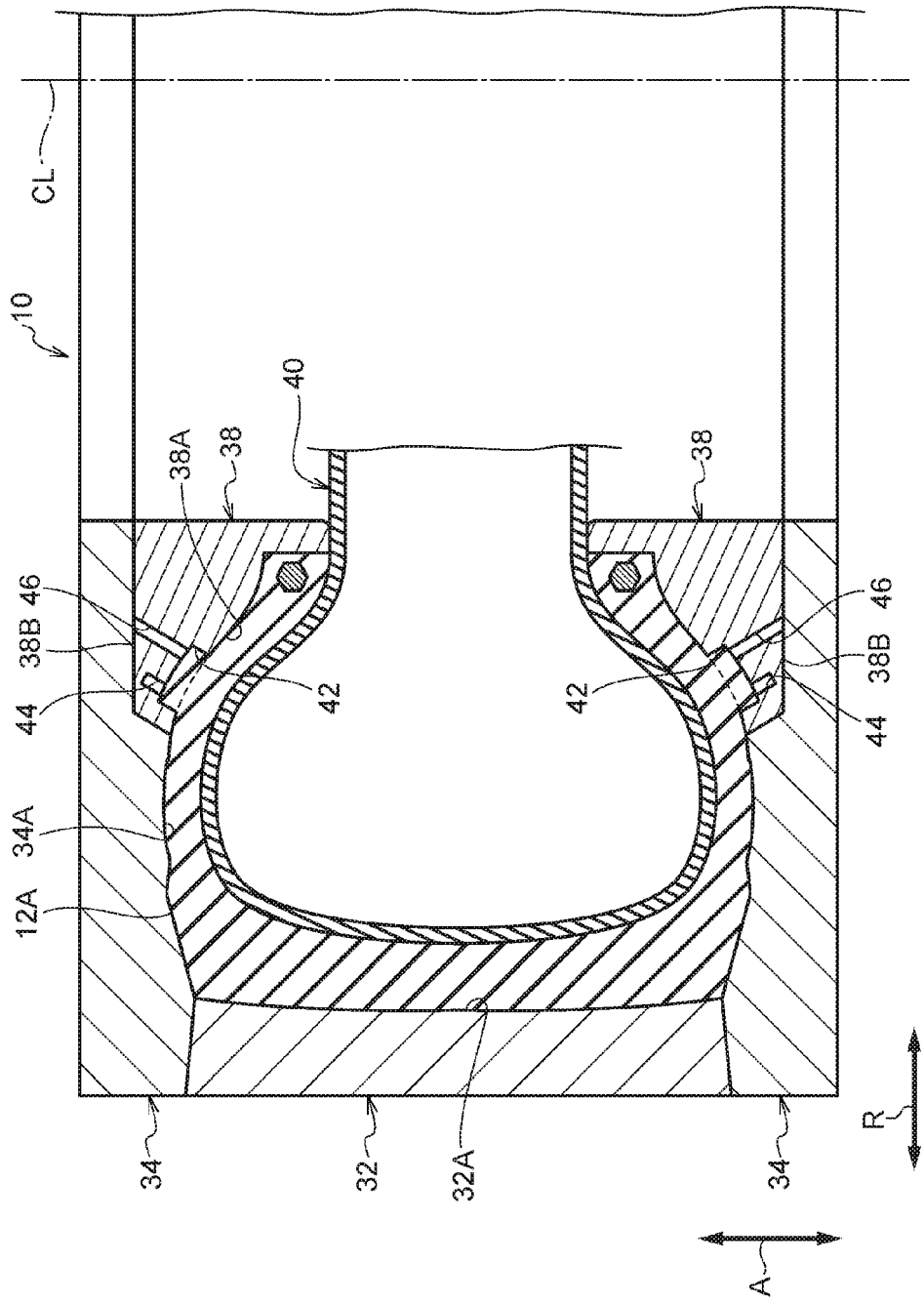
FIG. 2 is a vertical cross-section along an axial line of a tire forming-mold, illustrating a state loaded with a green tire that has been expanded by a bladder.

The tire forming-mold 10 according to the present exemplary embodiment for vulcanization molding the pneumatic tire 12 is explained below with reference to FIG. 2. FIG. 2 is a cross-section of the tire forming-mold 10 along the tire width direction, in a state in which a sector mold 32, an upper and lower pair of side molds 34, and a pair of ring molds 38 have been combined.

An unvulcanized green tire 12A is housed inside a space (referred to as a vulcanizing space) formed between the sector mold 32, the upper and lower pair of side molds 34, a bladder 40, and the ring molds 38.

The sector mold 32 includes a tread pattern forming face 32A formed with indentations and projections (not illustrated in the drawings) forming a tread pattern. Each side mold 34 includes a sidewall forming face 34A that embosses the respective sidewall portion 22. Each ring mold 38 includes a bead portion forming face 38A that embosses the respective bead portion 14.

The sector mold 32 is capable of being moved in the tire radial direction (the arrow R direction) by a non-illustrated movement mechanism, and the side molds 34 and the ring molds 38 are capable of being moved in the tire width direction (the arrow A direction) by a non-illustrated movement mechanism.

When vulcanizing, a heated and pressurized fluid is injected into the bladder 40, such that the bladder 40 expands inside the unvulcanized green tire 12A, and the unvulcanized green tire 12A is pressed by the expanded bladder 40 against the tread pattern forming face 32A of the sector mold 32, the bead portion forming faces 34A of the side molds 34, and the bead portion forming faces 38A of the ring molds 38, and is thereby embossed.

Each bead portion forming face 38A includes protrusion-forming recesses 42 for forming the turbulent flow generating protrusions 30. The protrusion-forming recesses 42 are portions that are recessed from the bead portion forming face 38A so as to be indented toward an outside face 38B.

Figure 3A:
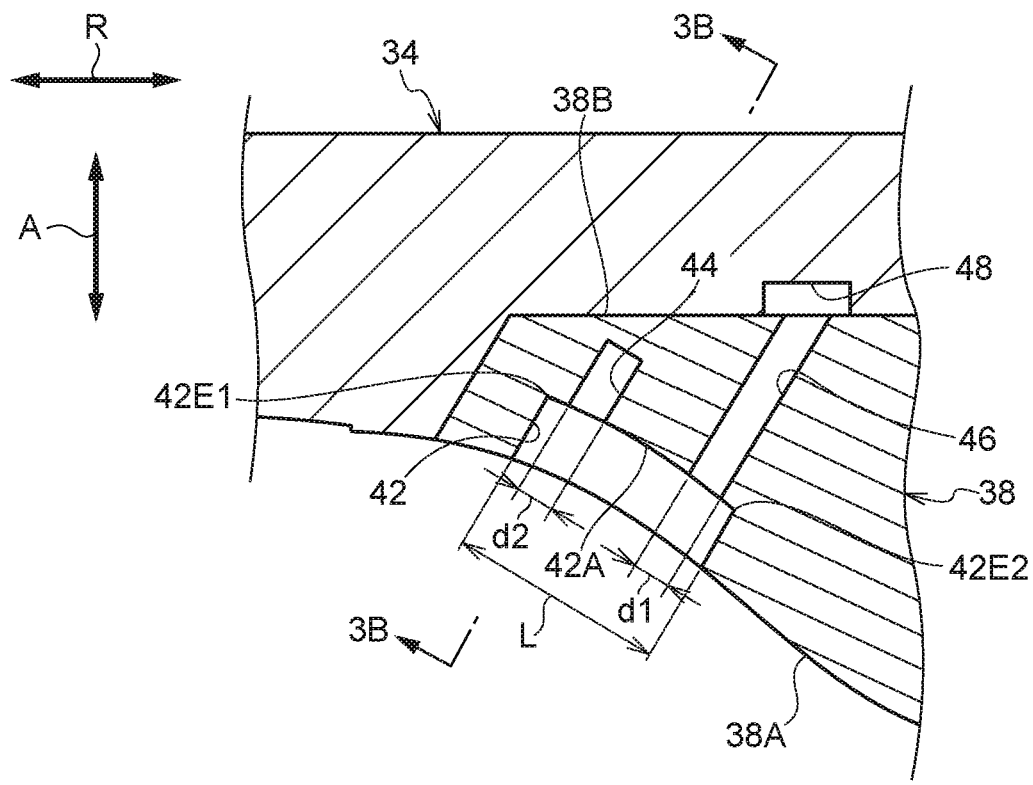
FIG. 3A is an enlarged view illustrating the periphery of a protrusion-forming recess illustrated in FIG. 2.
Figure 3B:
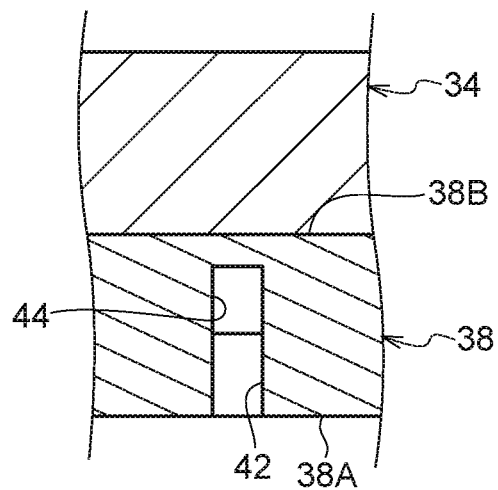
FIG. 3B is a cross-section along line 3B-3B in FIG. 3A.

Note that, as illustrated in FIG. 3A and FIG. 3B, in each of the protrusion-forming recesses 42 that are nearest to the outside face 38B at the tire width direction outside of each ring mold 38, a non-through-hole vent 44 is formed in the vicinity of a ring mold 38 radial direction outside end of a bottom portion 42A of the protrusion-forming recess 42, so as to be substantially perpendicular to the bottom portion 42A, extend toward the outside face 38B at the tire width direction outside, and terminate inside the ring mold. Moreover, a through-hole vent 46 is formed in the vicinity of a ring mold 38 radial direction inside end, so as to be substantially perpendicular to the bottom portion 42A, extend toward the outside face 38B, and be in communication with the outside face 38B. Note that, although not illustrated in the drawings, a mode may be adopted in which the protrusion-forming recesses 42 other than the protrusion-forming recesses 42 that are closest to the outside face 38B at the tire width direction outside of each ring mold 38 are formed with only the through-hole vent 46 and are not formed with the non-through-hole vent 44.

Note that air discharge grooves 48 for discharging air discharged from the through-hole vents 46 to the mold exterior are formed at positions facing the through-hole vents 46 in a face of each side mold 34 that contacts the respective outside face 389.

Each non-through-hole vent 44 is formed in a location of the respective ring mold 38 at which a distance from the respective protrusion-forming recess 42 to the outside face 38B is relatively short. Each through-hole vent 46 is formed in a location of each ring mold 38 at which a distance from the respective protrusion-forming recess 42 to the outside face 38B is relatively long (a location at which there is a longer distance to the outside face 38B than at the location at which the non-through-hole vent 44 is formed). The length of each through-hole vent 46 is set longer than the length of each non-through-hole vent 44.

In the present exemplary embodiment, a cross-section profile of each non-through-hole vent 44 at right angles to the length direction has a circular shape, and a cross-section profile of each through-hole vent 46 at right angles to the length direction also has a circular shape. In the present exemplary embodiment, a diameter $d2$ of each non-through-hole vent 44 and a diameter $d1$ of each through-hole vent 46 are the same diameter as each other; however, these diameters may be different.

The maximum diameters of the diameter dimension $d2$ of each non-through-hole vent 44 and the diameter dimension $d1$ of each through-hole vent 46 are preferably the width dimension (tire circumferential direction dimension) W of each protrusion-forming recess 42, or less. In cases of machining by drilling, the minimum diameters are preferably 0.5 mm or greater, and are more preferably 0.9 mm or greater, in consideration of machinability. Moreover, the through-hole vents 46 have a role of discharging air that is inside the mold, and the resistance is larger and air is difficult to discharge when the diameter is less than 0.5 mm.

Note that the non-through-hole vents 44 and the through-hole vents 46 are not limited to being machined by drilling, and may be formed by electrical discharge or the like.

Each non-through-hole vent 44 is preferably formed within a region of 25% of a length L of the bottom portion 42A from an end portion 42E1 of the bottom portion 42A, such that air does not collect in corner portions at length direction end portion sides of the respective protrusion-forming recess 42. Each through-hole vent 46 is preferably formed within a range of 25% of the length L of the bottom portion 42A from an end portion 42E2 of the bottom portion 42A.

Explanation follows regarding operation of the tire forming-mold 10 of the present exemplary embodiment.

Figure 4A:
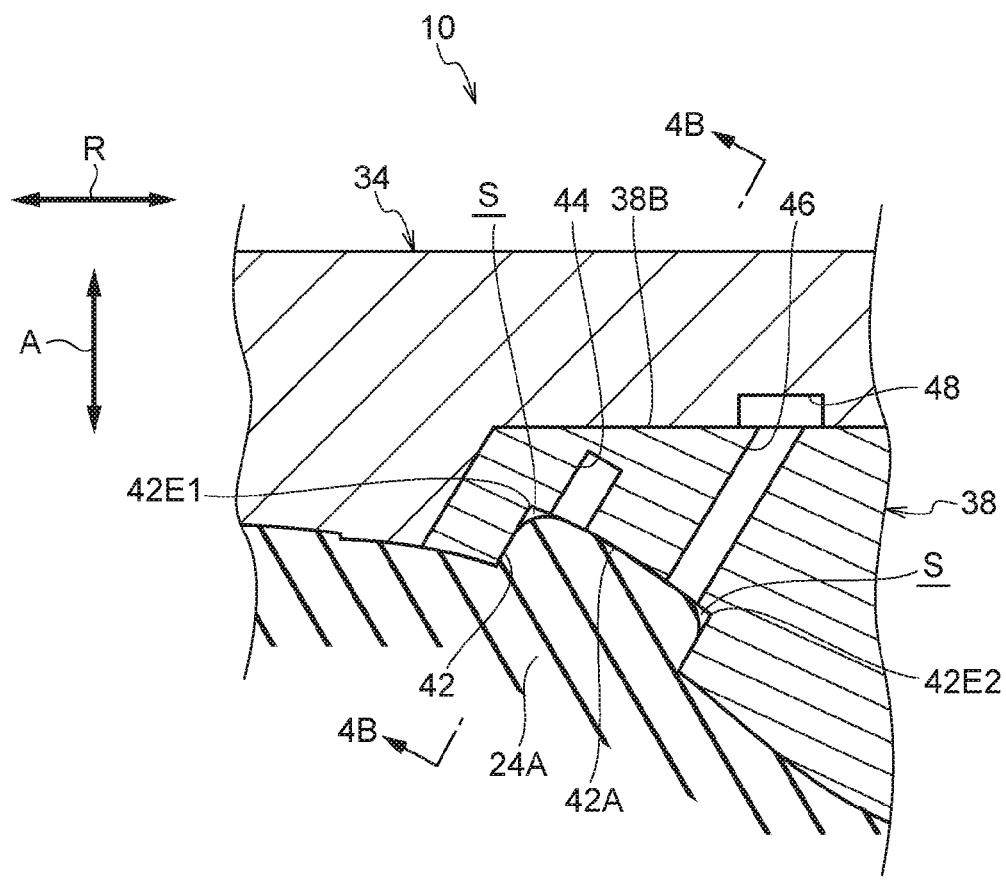
FIG. 4A is an enlarged view of the periphery of a protrusion-forming recess illustrating a state in which there is an ingress of unvulcanized rubber into the protrusion-forming recess.
Figure 4B:
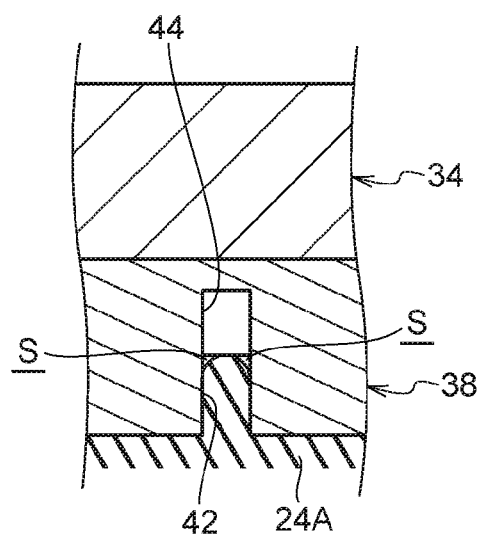
FIG. 4B is a cross-section along line 4B-4B in FIG. 4A.

As illustrated in FIG. 2, when the unvulcanized green tire 12A is loaded into the tire forming-mold 10 and the bladder 40 is expanded, a tire outer face is pressed onto a mold inner face, and, as illustrated in FIG. 4A and FIG. 4B, unvulcanized side rubber 24A enters each protrusion-forming recess 42. At this point in time, gaps S through which air can pass are present at the periphery of the bottom portion 42A.

Figure 5A:
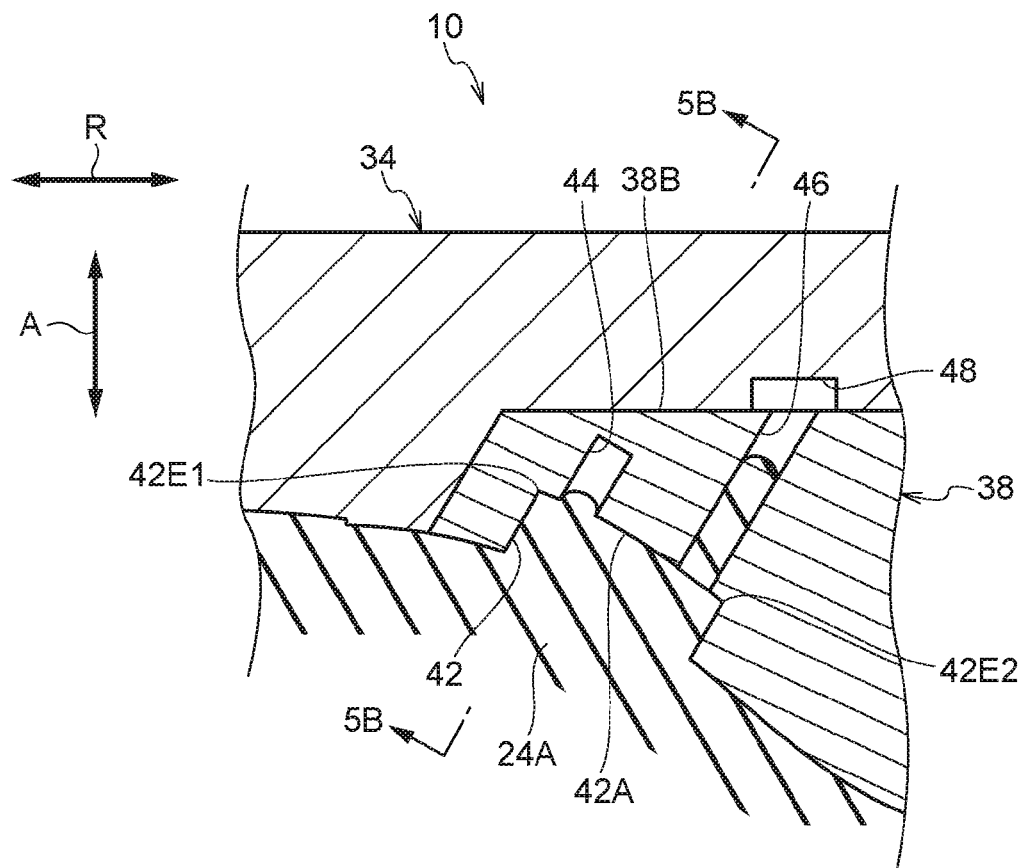
FIG. 5A is an enlarged view of the periphery of a protrusion-forming recess illustrating a state in which unvulcanized rubber has completely filled the protrusion-forming recess.
Figure 5B:
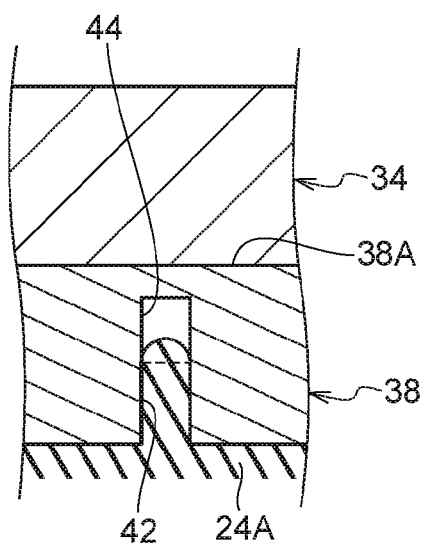
FIG. 5B is a cross-section along line 5B-5B in FIG. 5A.

When the unvulcanized side rubber 24A enters each protrusion-forming recess 42, air inside the protrusion-forming recess 42 is gradually discharged to the exterior through the through-hole vent 46, and the unvulcanized side rubber 24A enters further into the protrusion-forming recess 42, toward the corner portions thereof. Finally, almost all the air inside the protrusion-forming recess 42 is discharged to the exterior through the through-hole vent 46, and, as illustrated in FIG. 5A and FIG. 5B, part of the unvulcanized side rubber 24A that has entered the protrusion-forming recess 42 enters the non-through-hole vent 44 and the through-hole vent 46.

At the corner portion at the side at which the through-hole vent 46 of each protrusion-forming recess 42 is formed, air pressed by the unvulcanized rubber is discharged to the exterior through the through-hole vent 46 disposed close to this corner portion. Thus, the unvulcanized rubber fills the corner portion at the side at which the through-hole vent 46 of each protrusion-forming recess 42 is formed, without air collecting therein.

At the corner portion on the side at which the non-through-hole vent 44 of each protrusion-forming recess 42 is formed, there are cases in which air remains that was not discharged to the exterior though the through-hole vent 46, albeit in a minute amount. However, the remaining minute amount of air is pressed by the ingress of unvulcanized rubber into the protrusion-forming recess 42 and enters the non-through-hole vent 44 disposed close to this corner portion. Thus, the unvulcanized rubber fills the corner portion on the side at which the non-through-hole vent 44 of each protrusion-forming recess 42 is formed without air collecting therein.

Note that a minute amount (such as approximately 0.3% of the capacity of each protrusion-forming recess 42) of air that was not discharged to the exterior through the through-hole vent 46 remains in an end portion of the non-through-hole vent 44.

The unvulcanized rubber is then heated and vulcanized by conventionally heating the tire forming-mold 10, thereby completing the end product pneumatic tire 12.

In the above manner, using the tire forming-mold 10 of the present exemplary embodiment, the unvulcanized side rubber 24A is filled to the corners of the protrusion-forming recesses 42 without air collecting in the corner portions of the protrusion-forming recesses 42 during vulcanization. Thus, there are no indentations (hollows) formed in the surface of the turbulent flow generating protrusions 30 of the pneumatic tire 12 after vulcanization molding.

When the unvulcanized side rubber 24A that has entered the non-through-hole vents 44 and the through-hole vents 46 is vulcanized, it becomes spews projecting out from the turbulent flow generating protrusions 30, however, these spews can be removed by conventional cutting, grinding, or the like.

Note that, although a slight amount of air remains in the non-through-hole vents 44, the volume of air is a minute amount, and leading ends of the spews do not become sticky. Thus, stickiness on the tread surface of the end product pneumatic tire 12 is suppressed, and the stickiness does not adhere to the mold inner face (such as the non-through-hole vents 44), which reduces the effort required to clean the mold.

Note that each through-hole vent 46 is formed in a portion at which there is a long distance from the respective protrusion-forming recess 42 to the outside face 38B of the respective ring mold 38, and is set with a long overall length. Thus, even if there is an ingress of unvulcanized side rubber 24A pressed by the bladder 40 into the through-hole vent 46, a leading end of the ingress of unvulcanized side rubber 24A does not reach as far as the outside face 38B of the ring mold 38, and stops at a length direction intermediate portion of the through-hole vent 46. Thus, the spew can be easily removed from the through-hole vent 46 without breaking off when extracting the pneumatic tire 12 after vulcanization. Accordingly, this reduces the effort required to clean by removing spews stuck inside the holes.

Note that the amount of air remaining in the corner portion on the side at which the non-through-hole vent 44 is formed is a minute amount of a volume of approximately 0.3% of the capacity of the respective protrusion-forming recess 42. Thus, the capacity of each non-through-hole vent 44 is preferably set at 0.3% or greater, and is preferably set at 0.5% or greater in consideration of variations in the amount of air, in order for the minute amount of air that has remained in the corner portion without being able to be discharged through the through-hole vent 46 to escape to the non-through-hole vent 44, such that air does not collect in the corner portion on the side at which the non-through-hole vent 44 is formed.

Note that when the capacity of the non-through-hole vent 44 is less than 0.3% of the capacity of the respective protrusion-forming recess 42, there is a concern that air remains inside the protrusion-forming recess 42 and indentations (hollows) are formed on the surface of the respective turbulent flow generating protrusion 30.

There no problems arise if the capacity of each non-through-hole vent 44 exceeds 0.3%, since the ingress amount of the unvulcanized side rubber 24A pressed by the bladder 40 simply increases, and the volume of air ingress does not increase. Note that the length of the non-through-hole vent 44 may be any length as long as it does not penetrate the respective ring mold 38.

When the diameter dimension d1 (see FIG. 3A) of each through-hole vent 46 is larger than the width dimension W of the respective protrusion-forming recess 42, spew formed at the through-hole vent 46 becomes too thick, the quality of the external appearance is lowered, and the rigidity of the spew increases such that is it harder to remove the spew. In the present exemplary embodiment, the width dimension W of each protrusion-forming recess 42 is 5 mm, and so it is sufficient that an upper limit value of the diameter dimension d1 of each through-hole vent 46 is suppressed to 5 mm or less, such as approximately 4.5 mm. The diameter dimension d2 of each non-through-hole vent 44 is preferably set similarly to the diameter dimension d1 of each through-hole vent 46.

When the diameter dimension d1 of each vent hole 46 is too narrow, the ability to discharge air inside the respective protrusion-forming recess 42 is lowered (insufficient), and the protrusion cannot be sufficiently formed. Moreover, the rubber (spew) formed in the through-hole vent 46 breaks off when being extracted from the tire forming-mold 10 due to a reduction in rigidity of the spew and a high in-tube resistance, and rubber remains inside the through-hole vent 46. When the diameter dimension d1 of each through-hole vent 46 is too large, the in-tube resistance is too low and the rubber easily enters the through-hole vent 46, such that the length of the through-hole vent 46 needs to be lengthened, leading to an increase in size of the mold overall. Thus, it is sufficient that the diameter of each through-hole vent 46 is set such that the ingress of the leading end of the unvulcanized side rubber 24A therein stops inside the through-hole vent 46, such that the entire mold does not increase in size.

Note that the capacity of each non-through-hole vent 44 (minimum value thereof) is important with respect to the effect of suppressing stickiness of the respective turbulent flow generating protrusion 30, which is not influenced by the diameter dimension d2 or the length of the non-through-hole vent 44.

Test Examples

In order to confirm the advantageous effects of the exemplary embodiment, plural tire forming-molds (Test Examples 1 to 10) with different types of vent holes were employed, and a comparison of vulcanization molded pneumatic tires was performed. The evaluation results are shown in Tables 1 and 2 below. The structure of the tire forming-molds is the same structure as the tire forming-mold 10 of the above-described exemplary embodiment.

Figure 6:
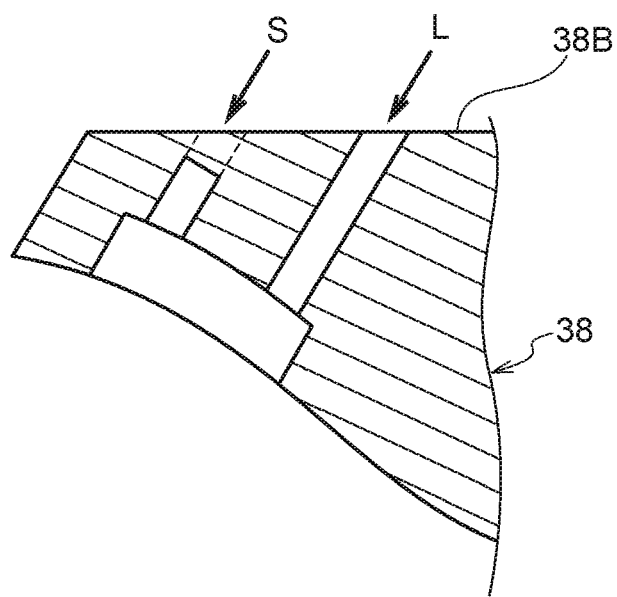
FIG. 6 is a cross-section illustrating vent holes formed in a tire forming-mold employed in testing.

A refers to the location of a vent hole formed at a portion at which there is a short distance from the respective protrusion-forming recess 42 to the outside face 38B of the respective ring mold 38, as illustrated by the arrow S in FIG. 6, and B refers to the location of a vent hole formed at a portion at which there is a long distance from the respective protrusion-forming recess 42 to the outside face 38B of the respective ring mold 38, as illustrated by the arrow L in FIG. 6. In the test, the lengths of the vent holes were adjusted in order to adjust the ratio of the capacity of the non-through-hole vent to the capacity of the respective turbulent flow generating protrusion (protrusion-forming recess).

After each pneumatic tire had been vulcanization molded, the fill ratio of rubber into the turbulent flow generating protrusions, the presence of rubber stuck in the mold, and the presence of tacky rubber (stickiness) on the surface of the turbulent flow generating protrusions, were compared as an evaluation method. In the test, a pass was determined in cases in which the rubber fill ratio of the turbulent flow generating protrusions was 100% (no occurrence of hollows), no occurrence of the rubber adhering or sticking to the mold, and tacky rubber (stickiness) did not occur on the surface of the turbulent flow generating protrusions. A fail was determined in cases in which in which any of the above occurred.

The evaluation of the presence of tacky rubber (stickiness) was performed by pressing the rubber surface against white paper, and the rubber was evaluated as tacky in cases in which the rubber adhered to the white paper, and the rubber was evaluated as not tacky in cases in which the rubber did not adhere to the white paper.

TABLE 1

|  |  | Test Example 1 | Test Example 2 | Test Example 3 | Test Example 4 | Test Example 5 |
|---|---|---|---|---|---|---|
| Location A | Mode of vent hole | Non-penetrating | Non-penetrating | Penetrating | None | Non-penetrating |
|  | Capacity ratio of vent hole to turbulent flow generating protrusion (protrusion-forming recess) | 13% | 1% | — | 0% | 0.2% |
| Location B | Mode of vent hole | Non-penetrating | Non-penetrating | Penetrating | Penetrating | Penetrating |
|  | Capacity ratio of vent hole to turbulent flow generating protrusion (protrusion-forming recess) | 13% | 1% | — | — | — |
| Evaluation results | Rubber fill ratio of turbulent flow generating protrusions | 100% | 97% | 100% | 99.7% | 99.9% |
|  | Rubber adhesion to mold, rubber stuck in mold | Rubber adhesion to mold at both A and B | Rubber adhesion to mold at both A and B | Rubber stuck at A only | No | No |
|  | Occurrence of tacky rubber (stickiness) | Occurred at both A and B | Occurred at both A and B | No | No | No |
|  | Determination | Fail | Fail | Fail | Fail | Fail |

TABLE 2

|  |  | Test Example 6 | Test Example 7 | Test Example 8 | Test Example 9 | Test Example 10 |
|---|---|---|---|---|---|---|
| Location A | Mode of vent hole | Non-penetrating | Penetrating | Non-penetrating | Non-penetrating | Non-penetrating |
|  | Capacity ratio of vent hole to turbulent flow generating protrusion (protrusion-forming recess) | 0.3% | — | 3% | 8% | 13% |
| Location B | Mode of vent hole | Penetrating | Non-penetrating | Penetrating | Penetrating | Penetrating |
|  | Capacity ratio of vent hole to that of the turbulent flow generating protrusion (protrusion-forming recess) | — | 0.3% | — | — | — |
| Evaluation results | Rubber fill ratio of turbulent flow generating protrusions | 100% | 100% | 100% | 100% | 100% |
|  | Rubber adhesion to mold, rubber stuck in mold | No | Rubber stuck at A only | No | No | No |
|  | Occurrence of tacky rubber (stickiness) | No | No | No | No | No |
|  | Determination | Pass | Fail | Pass | Pass | Pass |

As shown in the test results in Tables 1 and 2, in each of the pneumatic tires manufactured using tire forming-molds (Test Examples 6, 8, 9, and 10) in which each through-hole vent was formed at a portion with along distance from the respective protrusion-forming recess to the mold outer face, and each non-through-hole vent was formed at a portion with a short distance from the respective protrusion-forming, recess to the mold outer face, the fill ratio of the turbulent flow generating protrusions was 100% namely, there was no occurrence of hollows), there was no rubber adhering to the mold or rubber stuck in the mold, and tacky rubber (stickiness) did not occur on the surface of the turbulent flow generating protrusions after vulcanization molding, thereby demonstrating the effects of the present invention. Note that even when the capacity of the non-through-hole vents was 3%, 8%, or 13% of that of the turbulent flow generating protrusions (the protrusion-forming recesses), the rubber did not become tacky. Thus, there is no particular limitation to the upper limit of the capacity of the non-through-hole vents.

Other Exemplary Embodiments

An exemplary embodiment of the present invention has been explained above; however, the present invention is not limited to the above description, and obviously various other modifications may be implemented within a range not departing from the spirit of the present invention.

Figure 7:
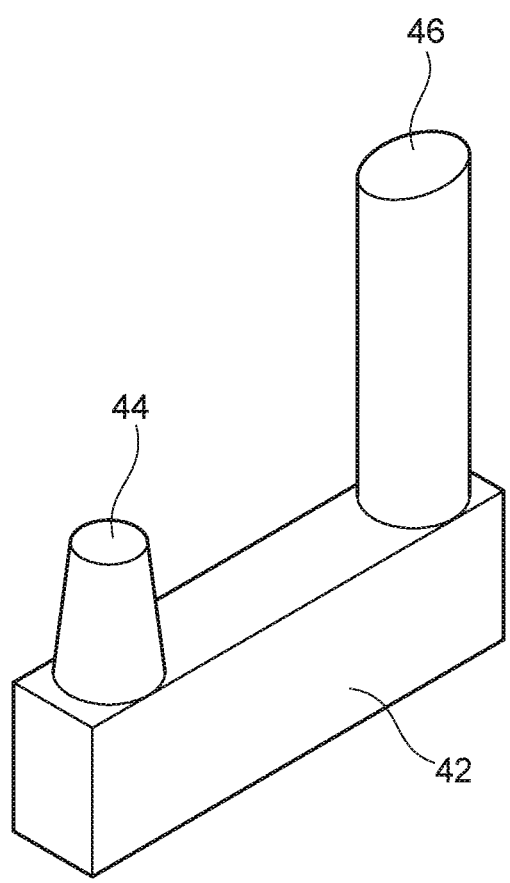
FIG. 7 is a perspective view illustrating a non-through-hole vent and a through-hole vent according to another exemplary embodiment.

The non-through-hole vents 44 of the above-described exemplary embodiment each have a constant diameter across their entire length; however, as illustrated in FIG. 7, the diameter may become smaller toward a leading end.

Figure 8:
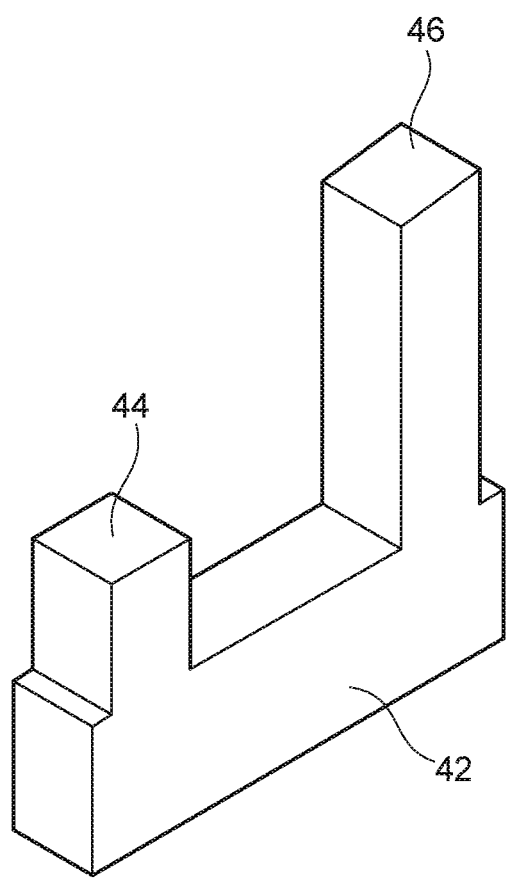
FIG. 8 is a perspective view illustrating a non-through-hole vent and a through-hole vent according to yet another exemplary embodiment.

The non-through-hole vents 44 and the through-hole vents 46 of the above-described exemplary embodiment each have a cross-section profile at right angles to the length direction that is circular shaped; however, the present invention is not limited thereto, and as illustrated in FIG. 8, the cross-section profile may be a shape other than a circular shape, such as a square shape.

In the above-described exemplary embodiment, one non-through-hole vent 44 and one through-hole vent 46 are provided at each protrusion-forming recess 42; however, the number of non-through-hole vents 44 and through-hole vents 46 may be increased according to the size of each protrusion-forming recess 42.

In the above exemplary embodiment, the non-through-hole vents 44 and the through-hole vents 46 are formed to the protrusion-forming recesses 42 for forming the turbulent flow generating protrusions 30 of the bead portions 14. However, vent holes may be formed to all recessed portions of the mid that are recessed portions for forming protrusions formed on the outer face of the pneumatic tire 12. For example, vent holes may be formed to recessed portions for forming blocks or ribs of the tread. This enables the occurrence of tackiness on the blocks or ribs to be suppressed.

In the tire forming-mold 10 of the above exemplary embodiment, as illustrated in FIG. 3A, each non-through-hole vent 44 and through-hole vent 46 are substantially perpendicular to the bottom portion 42A of the respective protrusion-forming recess 42, and are formed at an incline with respect to the movement direction of the side molds 34 and the ring molds 38 (the tire width direction, this being the arrow A direction). However, in the tire forming-mold 10 illustrated in FIG. 9, each non-through-hole vent 44 and each through-hole vent 46 is formed parallel to the movement direction of the side molds 34 and the ring molds 38 (the arrow A direction).

Figure 9:
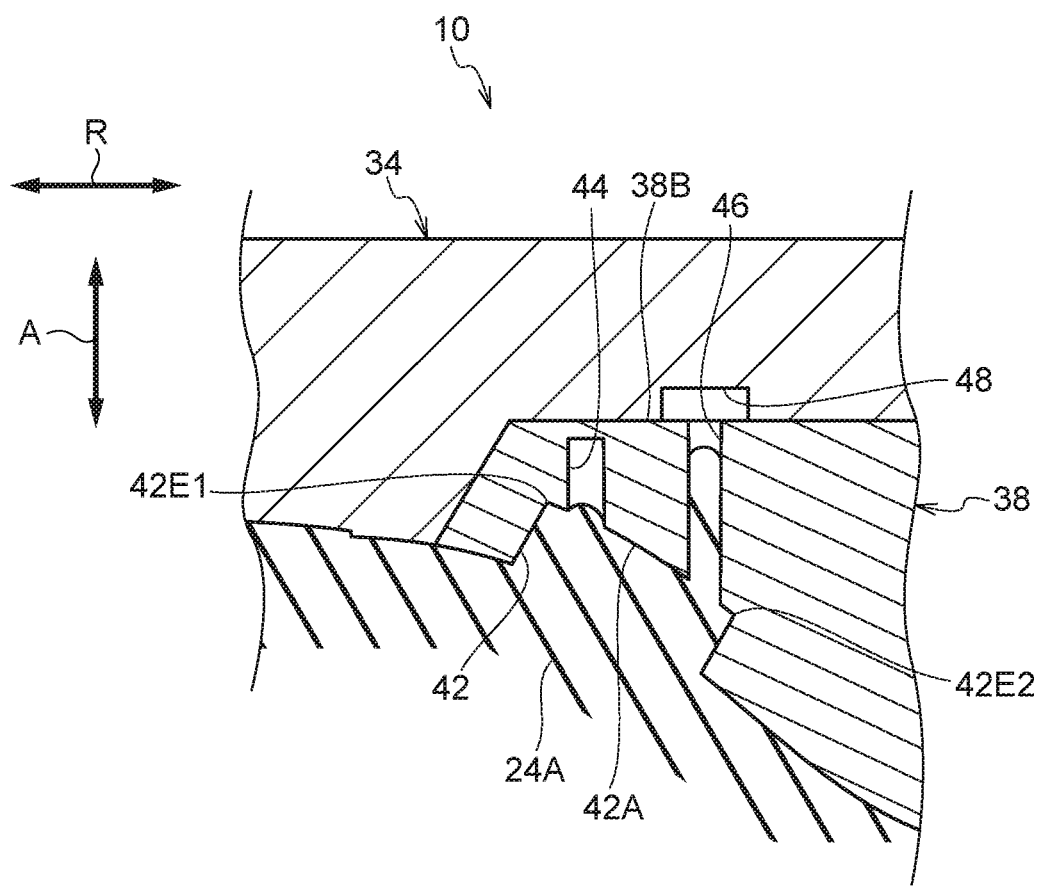
FIG. 9 is a cross-section illustrating part of a tire forming-mold according to another exemplary embodiment.

In the tire forming-mold. 10 illustrated in FIG. 9, the movement direction of each non-through-hole vent 44 and through-hole vent 46 is aligned with the length direction of spews formed in the non-through-hole vent 44 and the through-hole vent 46. This enables the spews formed in the non-through-hole vent 44 and the through-hole vent 46 to be smoothly extracted from the non-through-hole vent 44 and the through-hole vent 46.

The entire content of the disclosure of Japanese Patent Application No. 2014-045638 filed Mar. 7, 2014 is incorporated by reference in the present specification.

All publications, patent applications and technical standards mentioned in the present specification are incorporated by reference in the present specification to the same extent as if the individual publication, patent application, or technical standard was specifically and individually indicated to be incorporated by reference.

The invention claimed is:

1. A tire forming-mold, comprising:
   a mold that includes a surface-forming section that contacts a surface of a green tire and embosses a tire outer face;
   a recess shaped protrusion-forming recess for forming a protrusion on the tire outer face, the protrusion-forming recess being provided at the mold;
   a non-through-hole vent that has one end portion in communication with the protrusion-forming recess and another end portion terminating inside the mold; and
   a through-hole vent that is provided at the mold, that is set with a larger capacity than of the non-through-hole vent, and has one end in communication with the protrusion-forming recess and another end in communication with a mold outer portion.

2. The tire forming-mold of claim 1, wherein the through-hole vent is formed at a portion at which a mold thickness from the protrusion-forming recess to the mold outer face is thicker than that of the non-through-hole vent.

3. The tire forming-mold of claim 1, wherein the protrusion-forming recess is provided at a portion of the surface-forming section that forms a tire side portion, the protrusion-forming recess forming a turbulent flow generating protrusion that generates a turbulent flow during tire rotation.

4. The tire forming-mold of claim 1, wherein depth directions of the non-through-hole vent and the through-hole vent are aligned with a movement direction of the mold.

5. A tire manufacturing method, comprising:
   loading a green tire into an interior of the tire forming-mold of claim 1;
   expanding the green tire loaded into the tire forming-mold using a bladder, pressing a surface of the green tire against the surface-forming section, and causing an ingress of unvulcanized rubber configuring the green tire into the protrusion-forming recess; and
   heating and vulcanizing the green tire.

\* \* \* \* \*